United States Patent
Czaplicki et al.

(10) Patent No.: US 6,682,818 B2
(45) Date of Patent: Jan. 27, 2004

(54) PAINTABLE MATERIAL

(75) Inventors: Michael J. Czaplicki, Rochester, MI (US); Renee Bradley, St. Clair, MI (US); Jeff Bradley, Imlay City, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/939,245

(22) Filed: Aug. 24, 2001

(65) Prior Publication Data

US 2003/0049453 A1 Mar. 13, 2003

(51) Int. Cl.$^7$ .............................. B32B 27/38
(52) U.S. Cl. ................... 428/413; 428/355 EP; 428/355 AC; 428/343
(58) Field of Search ................. 428/413, 343, 428/355 EP, 355 AC

(56) References Cited

U.S. PATENT DOCUMENTS

| 3,868,796 A | 3/1975 | Bush |
| 4,378,395 A | 3/1983 | Ashoshina et al. |

(List continued on next page.)

FOREIGN PATENT DOCUMENTS

| EP | 0 061 131 A2 | 9/1982 |
| EP | 0 236 291 A2 | 2/1986 |
| EP | 0 442 178 A1 | 8/1991 |
| EP | 0 775 721 A1 | 5/1997 |
| GB | 2 061 196 A | 5/1981 |
| JP | 4059820 | 2/1992 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 99/08854 | 2/1999 |

(List continued on next page.)

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Copending application Ser. No. 09/847,252 filed May 2, 2001.
Copending application Ser. No. 09/923,138 filed Aug. 6, 2001 (formerly Provisional Application Ser. No. 60/223, 667).
Copending application Ser. No. 09/858,939 filed May 16, 2001 (formerly Provisional Application Ser. No. 60/225, 126).
Copending application Ser. No. 09/502,686 filed Feb. 11, 2000.
Copending application Ser. No. 09/459,756 filed Dec. 10, 1999.
Copending application Ser. No. 09/676,335 filed Sep. 29, 2000.
Copending application Ser. No. 09/676,443 filed Sep. 29, 2000.
Copending application Ser. No. 09/676,725 filed Sep. 29, 2000.
Copending application Ser. No. 09/524,961 filed Mar. 14, 2000.
International Search Report dated Oct. 9, 2002.

*Primary Examiner*—Robert Dawson
*Assistant Examiner*—Christopher M. Keehan
(74) *Attorney, Agent, or Firm*—Dobrusin & Thennisch PC

(57) ABSTRACT

A sealant material and articles incorporating the same. The sealant material includes up to about 80% of an epoxy resin; up to about 40% of an epoxy/elastomer hybrid; up to about 40% of a rheology modifier; up to about 5% of a blowing agent; up to about 7% of a curing agent; and about 40 to about 60% of a filler.

20 Claims, 2 Drawing Sheets

U.S. PATENT DOCUMENTS

| | | | |
|---|---|---|---|
| 4,427,481 A | 1/1984 | Smith et al. |
| 4,444,818 A | 4/1984 | Tominaga et al. |
| 4,538,380 A | 9/1985 | Colliander |
| 4,605,460 A | 8/1986 | Schirmer |
| 4,693,775 A | 9/1987 | Harrison et al. |
| 4,724,243 A | 2/1988 | Harrison |
| 4,749,434 A | 6/1988 | Harrison |
| 4,769,166 A | 9/1988 | Harrison |
| 4,898,630 A | 2/1990 | Kitoh et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,266,133 A | 11/1993 | Hanley et al. |
| 5,470,886 A | 11/1995 | Makhlouf et al. |
| 5,577,784 A | 11/1996 | Nelson |
| 5,648,401 A | 7/1997 | Czaplicki |
| 5,712,317 A | 1/1998 | Makhlouf et al. |
| 5,783,272 A | 7/1998 | Wong |
| 5,806,919 A | 9/1998 | Davies |
| 5,851,626 A | 12/1998 | McCorry et al. |
| 5,884,960 A | 3/1999 | Wycech |
| 5,894,071 A | 4/1999 | Merz et al. |
| 5,931,474 A | 8/1999 | Chang et al. |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,077,884 A | 6/2000 | Hess et al. |
| 6,096,791 A | 8/2000 | Born et al. |
| 6,103,784 A | 8/2000 | Hilborn et al. |
| 6,133,335 A | 10/2000 | Mahoney et al. |
| 6,136,398 A | 10/2000 | Willett et al. |
| 6,136,944 A | 10/2000 | Stewart et al. |
| 6,153,302 A | 11/2000 | Karim et al. |
| 6,162,504 A | 12/2000 | Hubert et al. |
| 6,174,932 B1 | 1/2001 | Pachl et al. |
| 6,197,403 B1 | 3/2001 | Brown et al. |
| 6,218,442 B1 | 4/2001 | Hilborn et al. |
| 6,228,449 B1 | 5/2001 | Meyer |
| 6,232,433 B1 | 5/2001 | Narayan |
| 6,235,842 B1 | 5/2001 | Kuwano et al. |
| 6,244,601 B1 | 6/2001 | Buchholz et al. |
| 6,263,635 B1 | 7/2001 | Czaplicki |
| 6,277,898 B1 | 8/2001 | Pachl et al. |
| 6,287,669 B1 | 9/2001 | George et al. |
| 6,303,672 B1 | 10/2001 | Papalos et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,150 B1 | 9/2002 | Sheppard et al. |
| 6,455,476 B1 | 9/2002 | Imai et al. |
| 6,479,560 B2 | 11/2002 | Freitag et al. |
| 6,482,496 B1 | 11/2002 | Wycech |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |

FOREIGN PATENT DOCUMENTS

| | | |
|---|---|---|
| WO | WO 99/36243 | 7/1999 |
| WO | WO 99/50057 | 10/1999 |
| WO | WO 99/61216 | 12/1999 |
| WO | WO 99/61281 | 12/1999 |
| WO | WO 00/12595 | 3/2000 |
| WO | WO 00/13876 | 3/2000 |
| WO | WO 00/13958 | 3/2000 |
| WO | WO 00/20483 | 4/2000 |
| WO | WO 00/27920 | 5/2000 |
| WO | WO 00/37242 | 6/2000 |
| WO | WO 00/37243 | 6/2000 |
| WO | WO 00/37554 | 6/2000 |
| WO | WO 00/39232 | 7/2000 |
| WO | WO 00/40629 | 7/2000 |
| WO | WO 00/46461 | 8/2000 |
| WO | WO 00/52086 | 9/2000 |
| WO | WO 00/68041 | 11/2000 |
| WO | WO 01/57130 | 8/2001 |
| WO | WO 01/88033 | 11/2001 |

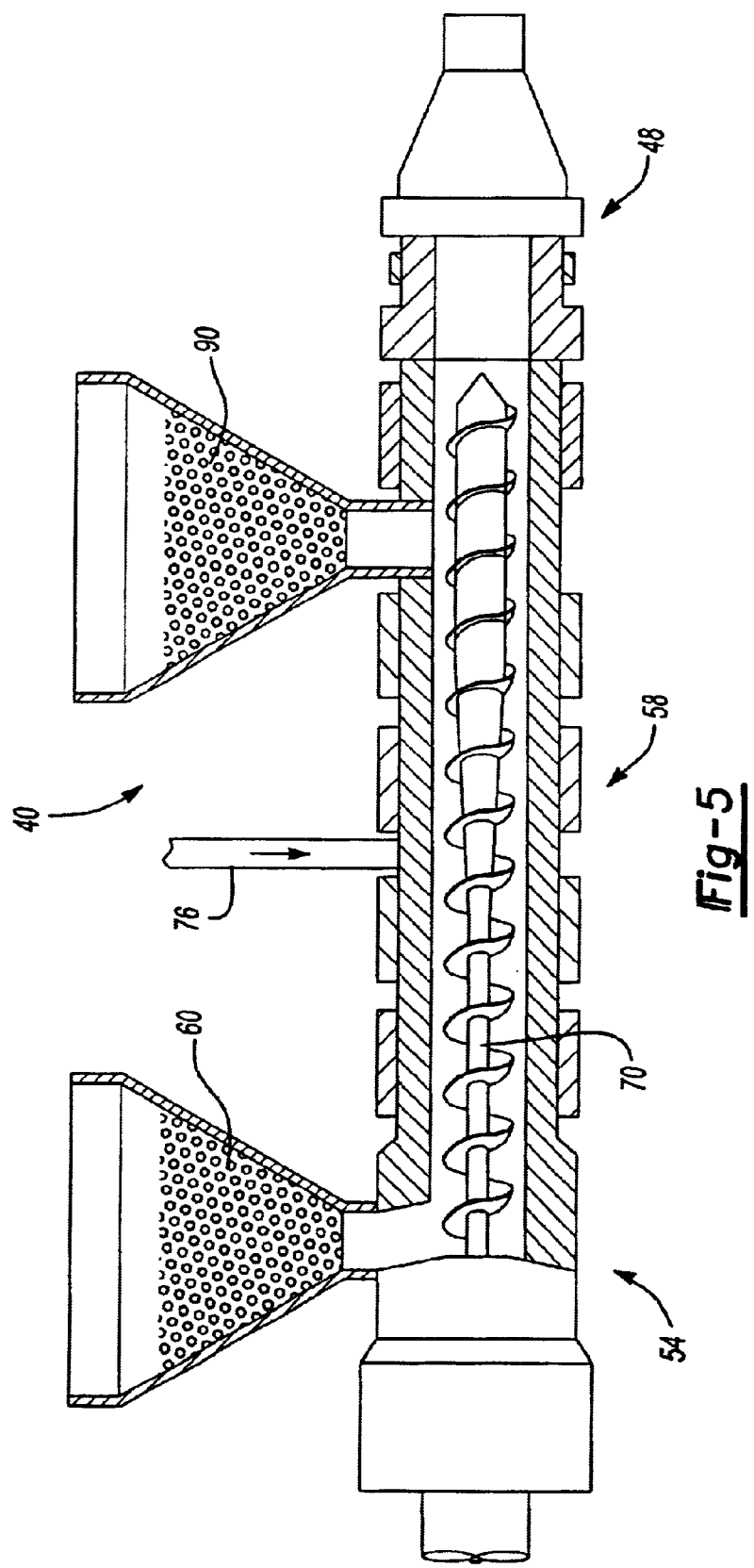

PAINTABLE MATERIAL

FIELD OF THE INVENTION

The present invention relates to paintable materials, and particularly sealant materials for covering a surface.

BACKGROUND OF THE INVENTION

Sealant materials are often applied to surfaces for sealing or for otherwise covering the surface, including any joints associated therewith. There presently exist a vast number of sealant materials that serve these purposes for different articles of manufacture. However, in certain circumstances, it may be desirable for sealant materials to serve other additional purposes depending on the components or articles of manufacture to which the sealant materials are applied.

For example, in some industries, such as the furniture, appliance or automotive industries, joints are typically part of a show surface, and are thus visible to a user or consumer. Accordingly, one desirable characteristic for a sealant for covering the joint is to provide a generally smooth or continuously or controlled patterned surface that is cosmetically pleasing. If colorant is not already included in the sealant, but a color is desirable, preferably the sealant material is paintable.

Certain assembly operations in the aforenoted industries and others, require that a sealant be heated along with the article to which it is applied. For instance, some priming or painting operations are conducted at elevated temperatures. Thus, another desirable trait for certain sealants is that they exhibit attractive temperature response characteristics for a desired application. For example, a metal shelving unit having a sealant applied to a joint thereon, upon heat exposure, advantageously will not experience random oozing, bubbling, rippling, or the like, which would require post treatment clean-up processes.

Further, in certain applications it may also be desirable for the sealant material to self level or otherwise flow in a predetermined manner during or after application of the material such that the sealant can properly function.

SUMMARY OF THE INVENTION

The present invention meets the above needs by providing an improved paintable sealant material, and articles incorporating the same, including:

(a) an epoxy resin material;
(b) an epoxy/elastomer mixture;
(c) a rheology modifier
(d) a blowing agent;
(e) a curing agent; and
(f) a filler.

The sealant material and methods of using it disclosed herein are particularly adapted for enabling the material to be painted using conventional or art-disclosed coating techniques.

The sealant material may be applied to a surface, or to joints within or between one or more surfaces. In some applications, the sealant material can be used for bonding a first surface to a second surface. The sealant material is extrudable, moldable, or processable using other art-disclosed techniques. In one particularly advantageous aspect, the sealant material is used for sealing or otherwise covering visible joints or hems on articles of manufacture such as, refrigerator doors, range tops, dishwashers, freezers, microwave ovens, desk tops, desk drawers, chair bumpers, filing cabinets, shelving, or the like.

The sealant material alternatively is applied to a variety of components of an automotive vehicle such as hem flanges, fuel filler doors, fuel filler assemblies, license plates, doors, door frames, ditches, vehicle grille assemblies, bumper guards, consoles, name plates, badges or the like. Moreover, in certain embodiments, the sealant material is attached to a substrate of a component as a separate pre-formed seal, e.g., molded into a desired configuration.

One additional particularly attractive feature of the present invention is the ability, in some applications, to employ the sealant material by itself and without any separately fabricated support substrate.

BRIEF DESCRIPTION OF THE DRAWINGS

The features and inventive aspects of the present invention will become more apparent upon reading the following detailed description, claims, and drawings, of which the following is a brief description:

FIG. 5 illustrates an example of how an extruder might be used to form and/or apply the sealant material of the present invention.

DETAILED DESCRIPTION OF THE PREFERRED EMBODIMENT

Figure 1:
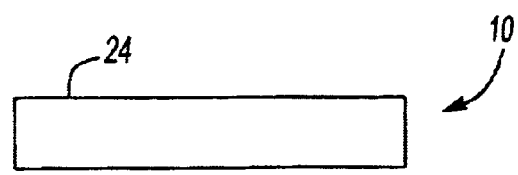
FIG. 1 illustrates a sectional view of an exemplary sealant material formed in accordance with an aspect of the present invention.

The present invention is predicated upon an improved sealant material, and articles incorporating the same, including:

(a) up to about 80% of an epoxy resin;
(b) up to about 40% of an epoxy/elastomer;
(c) up to about 40% of a rheology modifier;
(d) up to about 5% of a blowing agent;
(e) up to about 7% of a curing agent; and
(f) a filter.

Percentages herein refer to weight percent, unless otherwise indicated.

Epoxy Resin

Epoxy resin is used herein to mean any of the conventional dimeric, oligomeric or polymeric epoxy materials containing at least one epoxy functional group. The polymer based materials may be epoxy containing materials having one or more oxirane rings polymerizable by a ring opening reaction. In preferred embodiments, the sealant material includes up to about 80% of an epoxy resin. More preferably, the sealant includes between about 10% and 50% by weight of epoxy containing materials.

The epoxy containing materials may be aliphatic, cycloaliphatic, aromatic or the like. The epoxy may be supplied as a solid (e.g., as pellets, chunks, pieces or the like) or a liquid (e.g., an epoxy resin). The epoxy may include an ethylene copolymer or terpolymer that may possess an alpha-olefin. As a copolymer or terpolymer. the polymer is composed of two or three different monomers, i,e., small molecules with high chemical reactivity that are capable of linking up with similar molecules. Preferably, an epoxy resin is added to the sealant material to increase the flow properties of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive.

Epoxy/Elastomer

In a highly preferred embodiment, one or more of the epoxy containing materials may be provided to the sealant material as an epoxy/elastomer hybrid, e.g.. a blend or copolymer that has been previously fabricated. The epoxy/elastomer hybrid may be included in an amount of up to about 40% by weight of the sealant material. More preferably, the epoxy/elastomer hybrid is approximately 10 to 30%, and more preferably is about 20% by weight of the sealant material.

In turn, the hybrid itself generally includes about 1:5 to 5:1 parts of epoxy to elastomer, and more preferably about 1:3 to 3:1 parts or epoxy to elastomer. In one preferred embodiment, the epoxy/elastomer hybrid preferably includes approximately 40 to 80% of an epoxy resin (such as disclosed in the above), and about 20 to 60% of an elastomer compound. The elastomer compound may be any suitable art disclosed thermoplastic elastomer, thermosetting elastomer or a mixture thereof. Exemplary elastomers include, without limitation natural rubber, styrenebutadiene rubber, polyisoprene, polyisobutylene, polybutadiene, isoprenebutadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, EPDM (ethylene propylene diene rubbers), chlorosulphonated polyethylene, fluorinated hydrocarbons and the like. In one embodiment, recycled tire rubber is employed.

The epoxy/elastomer hybrid, when added to the sealant material, preferably is added to modify structural properties of the sealant material such as strength, toughness, stiffness, flexural modulus, or the like. Additionally, the epoxy/elastomer hybrid may be selected to render the sealant material more compatible with coatings such as water-borne paint or primer system or other conventional coatings.

Rheology Modifier

Preferably, the sealant material includes one or more materials for controlling the rheological characteristics of the sealant material over a range of temperatures (e.g., up to about 250° C.). When used, the rheology modifier preferably is present in an amount up to about 40%, and more preferably between about 1 to about 20%, and still more preferably less than about 10%. Of course, higher amounts are possible as well.

In one embodiment, any suitable art-disclosed rheology modifier may be used, and thus the rheology modifier may be organic or inorganic, liquid or solid, or otherwise. In a particularly preferred embodiment, the rheology modifier is a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate polymer). The rheology modifier may be provided in a generally homogeneous state or suitable compounded with other ingredients.

It may be possible to use certain acetates (e.g., EVA) in accordance with the present invention for certain applications. However, it is preferably that the rheology modifier (or the entire sealant) be substantially free of an acetate in view of the propensity for decomposition at higher temperatures and the attendant potential deleterious release of acetic acid onto a painted surface.

Blowing Agent

One or more blowing agents may be added to the sealant material for producing inert gasses that form as desired an open and/or closed cellular structure within the sealant material. In this manner, it may be possible to lower the density of articles fabricated from the material. In addition, the material expansion helps to improve sealing capability The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,oxy-bis-(benzenesulphonylhydrazide), trihydrazinotriazine and N, N,-dimethyl-N,N, dinitrosoterephthalamide. In a highly preferred embodiment, modified and unmodified azocarbonamides may be supplied to the material 10 in particle form having particles sizes of, for example, 120 and 180 microns. Advantageously, the azocarbonamides can assist the sealant material in leveling itself (i.e., forming a surface of maintaining the surface 24 in a substantially flat condition).

An accelerator for the blowing agents may also be provided in the sealant material. Various accelerators may be used to increase the rate at which the blowing agents form inert gasses. One preferred blowing agent accelerator is a metal salt, or is an oxide, e.g. a metal oxide, such as zinc oxide.

Amounts of blowing agents and blowing agent acoelerators can vary widely within the sealant material depending upon the type of cellular structure desired, the desired amount of expansion of the sealant material, the desired rate of expansion and the like. Exemplary ranges for Me amounts of blowing agents and blowing agent accelerators in the sealant material range from about 0% by weight to about 5% by weight and are preferably in the sealant material in fractions of weight percentages.

Curing Agent

One or more curing agents and/or curing agent accelerators may be added to the sealant material. Amounts of curing agents and curing agent accelerators can, like the blowing agents, vary widely within the sealant material depending upon the type of cellular structure desired, the desired amount of expansion of the sealant material, the desired rate of expansion, the desired structural properties of the sealant material and the like. Exemplary ranges for the curing agents or curing agent accelerators present in the sealant material range from about 0% by weight to about 7% by weight.

Preferably, the curing agents assist the sealant material in curing by crosslinking of the polymers, epoxy resins (e.g., by reacting in stoichiometrically excess amounts of curing agent with the epoxide groups on the resins) or both. It is also preferable for the curing agents to assist in thermosetting the sealant material. Useful classes of curing agents are materials selected from aliphatic or aromatic amines or their respective adducts, amidoamines, polyamides, cycloaliphatic amines (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines such as triethylenetetramine, diethylenetriamine tetraethylenepentamine, cyanoguanidine and the like. An accelerator for the curing agents (e.g., methylene diphenyl bis urea) may also be provided for preparing the sealant material.

Filler

The sealant material may also include one or more fillers, including but not limited to paticulated materials (e.g., powder), beads, microspheres, or the like. Preferably the filled includes a relatively low-density material that is generally nonreactive with the other components present in the sealant material.

Examples of fillers include silica, diatomaceous earth, glass, clay, talc, pigments, colorants, glass beads or bubbles, glass, carbon ceramic fibers, antioxidants, and the like. Such fillers, particularly clays, can assist the sealant material in leveling itself during flow of the material. The clays that may be used as fillers may include clays from the kaolinite, illite, chloritem, smecitite or sepiolite groups. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular.

When employed, the fillers in the sealant material can range from 10% to 90% by weight of the sealant material. According to some embodiments, the sealant material may include from about 0% to about 3% by weight, and more preferably slightly less that 1% by weight clays or similar fillers Powdered (e.g. about 0.01 to about 50, and more preferably about 1 to 25 micron mean particle diameter) mineral type filler can comprise between about 5% and 70% by weight, more preferably about 40% to about 60%, and still more preferably approximately 55% by weight of the sealant material. In one highly preferred embodiment the sealant material may contain approximately 7% by weight mica.

Other Additives

Other additives, agents or performance modifiers may also be included in the sealant material as desired, including but not limited to a UV resistant agent, a flame retardant, an impact modifier, a heat stabilizer, a colorant, a processing aid, a lubricant, a reinforcement (e.g., chopped or continuous glass, ceramic, aramid, or carbon fiber or the like).

Other polymers may also be incorporated into the sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, or mixtures thereof. Other potential polymeric materials may be or may include include, without limitation, polyethylene, polypropylene, polystyrene, polyolefin, polyacrlate, poly (ethylene oxide), poly(ethyleneimine), polyester, polyurethane, polysiloxane, polyether, polyphosphazine, polyamide, pplyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

When determining appropriate components for the sealant material, it may be important to form the material such that it will only activate (e.g., flow, foam or otherwise change states) at appropriate times or temperatures. For instance, in most applications, it is undesirable for the material to be reactive at room temperature or otherwise at the ambient temperature in a production environment More typically, the sealant material becomes activated to flow at higher processing temperatures. As an example, temperatures such as those encountered in an automobile assembly plant may be appropriate, especially when the sealant material is processed along with the other components at elevated temperatures or at higher applied energy levels, e.g., during painting preparation steps. Temperatures encountered in many coating operations, for instance, range up to about 250° C. or higher.

The present materials exhibit the ability to flow and self level to then serve as a generally smooth paintable surface within a temperature range up to about 100° C., more preferably up to about 175° C., still more preferably up to about 250° C., and even still more preferably up to about 325° C.

Formation of the sealant material can be accomplished according to a variety of new or known techniques. Preferably, the sealant material is formed as a material of substantially homogeneous composition. However, it is contemplated that various combining techniques may be used to increase or decrease the concentration of certain components in certain locations of the sealant material.

According to one embodiment, the sealant material is formed. by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment, the sealant material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the sealant material to activate (e.g., form gasses, flow or otherwise activate), cure (e.g., harden, stiffen or otherwise change states) or both. Notably, when the sealant material contains a blowing agent, it is typically desirable to maintain the temperature of the sealant material below a temperature that will activate the blowing agent during formation of the sealant material or before the sealant material is applied to a surface.

In situations where it is desirable to maintain the sealant material at lower temperatures it may be desirable to maintain the components in a semi-solid or viscoelastic state using pressure or a combination of pressure and heat to intermix the components of the sealing material. Various machines have been designed to applying heat, pressure or both to materials. One preferred machine is an extruder. According to one embodiment of the present invention, various components may be premixed into one, two or more pre-mixtures and introduced at one or various locations in a single or twin-screw extruder. Thereafter, the heat and pressure provided by the extruder mixes the sealant material in a single generally homogeneous composition, and preferably does so without activating the material.

As an example, and referring to FIG. 5, a first mixture 60 of components may be provided to a throat portion 54 of the extruder 40. Each of the components is preferably provided in solid forms such as chunks, pellets or powders that can be thoroughly mixed together in a tumbler or other mixing receptacle. The first mixture 60 may comprise any of the components discussed above. In a preferred embodiment, the first mixture 60 may include a combination of one or more components, which may be chosen from an epoxy resin, an epoxy/elastomer, a filler, another polymer or a mixture thereof.

As the first mixture 60 is introduced into the extruder 40, the extruder screw 70 mixes the components to form a viscoelastic material that is progressively moved from the throat portion 54 of the extruder 40 and through the intermediate portion 58 of the extruder. After substantial mixing of the first mixture 60, a side stream that is preferably liquid is provided to enhance mixing of the components in the extruder 40. The side stream preferably provides an epoxy in resin form that may or may not be combined with other components. Alternatively, the side stream may include any of the polymer materials discussed above.

Toward the die portion 48 of the extruder 40, a second mixture 90 is combined with the first mixture 60 and the material from the side stream. Again, each of the components is preferably provided in solid forms such as chunks, pellets or powders that can be thoroughly mixed together in a tumbler or other mixing receptacle.

Moreover, the second mixture 90 is a combination of one or more of the same components that were supplied in the first mixture 60. Additionally, however, any blowing agents, blowing agent accelerators, curing agents or curing agent accelerators are preferably added to the second mixture 90.

Once the first mixture 60, the side stream and the second mixture 90 are combined and mixed, they form the sealant material, which may be emitted from the extruder 40. The sealant material may then be transported and applied to substrates or, in certain circumstances, the material may be directly applied to a surface as it leaves the extruder 40. The skilled artisan will recognize that various other techniques may be used to form the sealant material from the various components.

FIGS. 1–4 illustrate an example of a sealant material 10 being applied to a substrate 12. The sealant material 10 may be applied to a variety of substrates. However, for exemplary purposes and with no intention of limiting the invention, the material 10 is shown as applied to components 14, 16 (e.g. overlapping panels) for forming a joint 18. The joint 18, as shown, is formed with overlapping arced portions of the two components 14, 16. In one embodiment, the substrate material is selected from steel, aluminum or plastic (e.g., reinforced plastic).

The sealant material 10 may be initially formed in a variety of shapes, sizes, patterns, thicknesses and the like and may be formed using a variety of forming techniques such as molding, extruding, thermosetting and the like. Alternatively, the sealant material 10 may be initially formed in a substantially liquid state wherein the material 10 is shaped by its container or shaped by a substrate to which the material has been applied. Preferably, the sealant material 10 is initially formed as a single homogeneous melt flowable composition, however, in alternative embodiments, the sealant material 10 may form one layer of a multi-layer article. The sealant material 10 may be dry to the touch shortly after it is initially formed to allow easer handling, packaging and the like of the material 10, however, it is also possible for the material 10 to be wet, tacky or both. In one preferred embodiment, shown in FIG. 1, the sealant material 10 has been extruded in a viscoelastic state as an elongated strip, which is shown in cross-section. Of course other section shapes (e.g., having an asymmetrical shape about a longitudinal axis, a symmetrical shape about the longitudinal axis, varying shapes along the longitudinal axis, longitudinal channels or passages, orate like) are contemplated as well and may be formed as desired or needed for any chosen application. It may also be possible to co-extrude the sealant material with a strip or Wire (e.g., for forming an encapsulated or laminated strip or wire, such as for making an antenna for a communications system). Molded or die-cut articles may also be formed from the sealant material of the present invention, Once the sealant material 10 has been formed in a desired configuration, the material may be activated, cured or both to form a seal of a desired configuration Activation of the sealant material, curing of the material or both may take place in a single stage or multiple stages and may utilize a variety of stimuli to cause activation or curing. Activation, as used herein, generally denotes inducing the sealant material 10 to flow, foam or generally soften and can be caused by exposure of the sealant material 10 to a variety of stimuli such as heat, light, electricity, pressure, moisture and the like. Curing, as used herein, generally denotes any stiffening, hardening, solidifying or the like of the sealant material and can be caused by exposure to a variety of stimuli such as cooling, light and the like.

Activation of the material may include at least some degree of foaming or bubbling in situations where the sealant material includes a blowing agent. Such foaming or bubbling can assist the sealant material in wetting a substrate and forming an intimate bond with the substrate. Alternatively, however, it shall be recognized that the sealant material may be activated to flow without foaming or bubbling and may still substantially wet the substrate to form a desired seal.

According to one embodiment, the sealant material may be activated prior to application of the sealant material to a substrate such that the sealant material is in a generally flowable state when it is applied to the substrate. In such a situation, curing of the material may occur during or after the time the sealant material is applied to the substrate.

According to another embodiment, the sealant material 10 may undergo a single stage activation, a single stage cure or both. In the embodiment, the sealant material is typically placed adjacent (e.g., in direct contact with or near) a substrate upon which the sealant material is to form a seal. Thereafter, the sealant material 10 is activated by exposure to a stimulus such as energy in the form of heat, light or otherwise that activates the sealant material 10 to flow over the substrate. Then, after a desired amount of flow has been induced, the sealant is cured substantially throughout its volume to form a seal upon the substrate.

Figure 2:
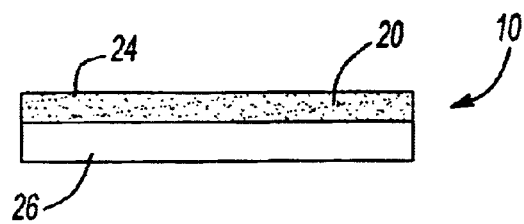
FIG. 2 illustrates a sectional view of the sealant material of FIG. 1 after a portion of the sealant material has been cured according to another aspect of the present invention.

According to still other embodiments, the sealant material 10 may undergo a selective multiple stage activation, a multiple stage cure or both. For example, a portion of the sealant material 10 may be exposed to a stimulus to at least partially cure a portion of the sealant material, e.g. a cure to a predetermined depth (e.g., on the order of about 1 mil to about 2 mm), or a cure in certain regions along or within the mass of material. In FIG. 2, the sealant material 10 is illustrated with a partially cured portion 20 that was formed by exposing at least one portion of the surface 24 of the sealant material to ultraviolet (UV) light, UV radiation, moisture, infrared light, heat or the like from a stimulus source to cross-link or otherwise cure the partially cured portion 20. As can be seen, the remainder of the sealant material 10 forms a second portion 26, which can be cured at a later time or different location.

Alternatively, the partially cured portion 20 may be formed by exposing a surface of the sealant material 10 to a stimulus (e.g., heat) that first activates (e.g.,softens) the portion 20 and then the portion 20 may be exposed to another stimulus (e.g., cooling) for curing. Preferably, the amount of heat used to activate the portion 20 is enough to soften the portion 20 without causing any substantial degree of flow. In this manner, the sealant material 20 can generally maintain the shape in which it was originally formed until it is later activated to flow over a substrate.

The partially cured portion 20 may be formed to most any depth within the sealant material 10 depending on the stimulus applied to the portion 20, the length of time of exposure to the stimulus and the like. Moreover, the length or depth of the selectively or partially cured portion 20 may be varied at different locations of the sealant material 10 as desired or depending upon the substrate to which the material 10 is being applied.

One particularly advantageous feature of the present invention is the ability to cure the present materials in the absence of a photo-initiator. Thus, while photo initiators might be employed in some applications, in one preferred embodiment, the composition of the present invention is substantially free of a photo initiator.

Curing or partial curing of the sealant material may also be effected using an acid cure for inducing homopolymerization on or within the material, or with a suitable liquid for effectuating the initiation of a condensation reaction. By way of example, a partial cure of a surface of the sealant material may be undertaken with any suitable acid, but more preferably with a mild acid (such as phosphoric add, citric acid or the like). It may also be performed by coating with a water dispersed or 100% amine-based liquid curing agent suitable for condensation polymerization. Under either approach, the liquid may optionally be rinsed after application.

Figure 3:
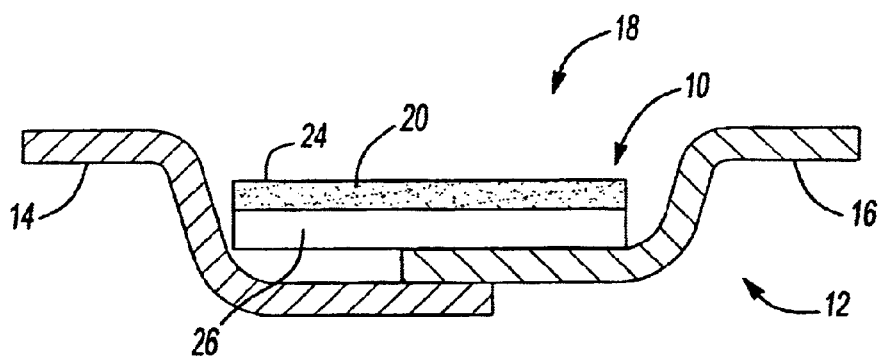
FIG. 3 illustrates a sectional view of the sealant material of FIGS. 1–2 as applied to an example of a substrate.

Before or after formation of the partially cured portion 20, the sealant material 10 is typically placed adjacent the substrate 12 such that the melt flowable portion 26 of the substrate 12 will be permitted to flow over a portion of the substrate 12. In FIG. 3, the strip of sealant material 10 is placed in the channel 18 such that a length of the strip extends along a length of the channel 18 and such that a width of the strip generally spans a width of the channel 18. Preferably, the melt flowable portion 26 is directly adjacent the overlapping portion of the panels 14, 16 and the partially cured portion 20 of the sealant material 10 faces out of the channel 18.

Figure 4:
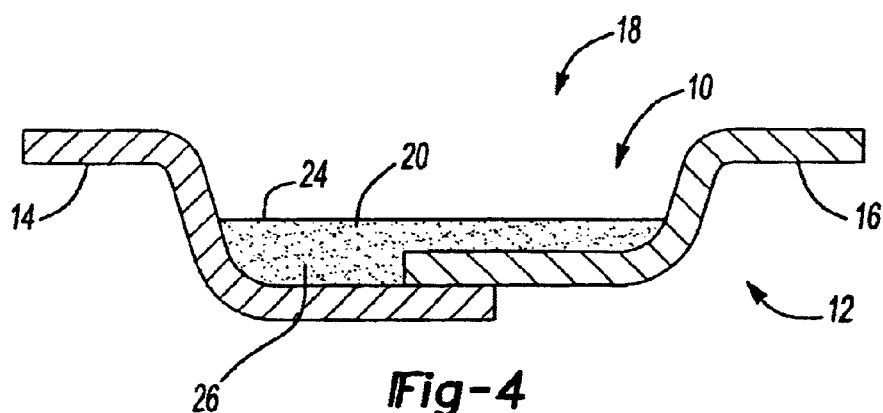
FIG. 4 illustrates a sectional view of the sealant material of FIGS. 1–3 after the material has flowed onto the substrate.

Once the sealant material 10 is situated as desired, the material 10 is exposed to heat or elevated temperature, such as from an e-coat process or other paint operation cycle thereby causing the flowable portion 26 to cover a portion of the substrate 12. In FIG. 4, the sealant material 10 is shown after it has been heated to a flowable state permitting the material 10 to intimately contact the overlapping portions of the panels 14, 16.

The sealant material of the present invention may be employed in any suitable thickness (e.g., from about 1 mil to about 10 mm, and more preferably about 1 to 5 mm).

In one particularly preferred embodiment, a sealed joint prepared in accordance with the present invention is further coated with a top coat (e.g., a paint) and optionally a primer (between the top coat and the joint), a clear coat (e.g., a polyurethane, an acrylic such as a glycidyl methacrylate (GMA)-based coating, or a mixture thereof) over the top coat, or a combination thereof. Preferably one such coating is a water-based coated, although solvent based coatings may also be used. In one embodiment, the coating includes a two component polyurethane coating. In another embodiment the coating is applied as a powder coating. Preferably an electocoating process is used to apply a coating layer, such as the primer.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An article of manufacture, comprising:
   a) a first panel;
   b) a second panel adjoining said first panel;
   c) a sealant that is free of a photoinitiator over said first panel and said second panel; said sealant material being at least Partially cured prior to coating; said sealant material consisting essentially of:
      i. an effective amount of an epoxy resin, the effective amount of epoxy resin being up to about 80% by weight of the sealant material,
      ii. an-effective amount of an epoxy/elastomer hybrid, the effective amount of epoxy/elastomer hybrid being up to about 40% by weight of the sealant material, the epoxy/elastomer hybrid having about 1:3 to 3:1 parts of epoxy to elastomer;
      iii. an effective amount of a rheology modifier, the effective amount of rheology modifier being up to about 40% by weight of the sealant material;
      iv. an effective amount of a blowing agent, the effective amount of blowing agent being up to about 5% by weight of the sealant material;
      v. an effective amount of a curing agent and an accelerator, the effective amount of curing agent and accelerator being up to about 7% by weight of the sealant material; and
      vi. a filler;
   d) a layer of primer over said sealant; and
   e) a layer of paint over said primer.

2. An article of manufacture, comprising:
a) a first panel and a second panel of an automotive vehicle;
b) a sealant material over said first panel and said second panel and being employed by itself and without any separately fabricated support substrate; the sealant material being at least partially cured prior to coating; said sealant material including
   i. an effective amount of an epoxy resin, the effective amount of epoxy resin being up to about 80% by weight of the sealant material,
   ii. an effective amount of an epoxy/elastomer hybrid, the effective amount of epoxy/elastomer hybrid being up to about 40% by weight of the sealant material, the epoxy/elastomer hybrid having about 1:3 to 3:1 parts of epoxy to elastomer;
   iii. an effective amount of an rheology modifier other than an ethylene vinyl acetate and including an acrylic, the effective amount of rheology modifier being up to about 40% by weight of the sealant material;
   iv. an effective amount of a blowing agent, the effective amount of blowing agent being up to about 5% by weight of the sealant material;
   v. an effective amount of a curing agent, the effective amount of curing agent being up to about 7% by weight of the sealant material, the curing agent including an amine; and
   vi. about 40 to about 60% of a mineral filler, wherein said sealant is substantially free of a photoinitiator.

3. An article of manufacture, comprising:
a) a first metal automotive vehicle panel selected from aluminum, steel or reinforced plastic;
b) a second automotive vehicle panel selected from aluminum, steel or reinforced plastic adjoining said first panel;
c) a sealant that is substantially free of a photoinitiator; over said first panel and said second panel; said sealant material being at least partially cured prior to coating and consisting essentially of:
   1. about 10 to about 50 parts by weight of an epoxy resin;
   2. about 10 to about 30 parts by weight of an epoxy/elastomer hybrid having about 1:3 to 3:1 parts of epoxy to elastomer;
   3. an effective amount of a rheology modifier including an acrylic, the effect amount of rheology modifier being up about 10 parts by weight of the sealant material;
   4. an effective amount of a blowing agent, the effective amount of blowing agent up to about 5 parts by weight of the sealant material;
   5. an effective amount of a curing agent, the effective curing agent being up to 7 parts by weight of the sealant material, the curing agent including an amine; and
   6. about 40 to about 60 parts by weight of a mineral filler;
d) a layer of primer over said sealant; and
e) a layer of paint over said primer.

4. The article of claim 1, wherein said sealant is substantially free of ethylene vinyl acetate.

5. The article of claim 1, wherein said sealant has been partially cured.

6. The article of claim 2, wherein said epoxy resin is present in an amount of about 10 to about 50% by weight, and said epoxy/elastomer hybrid is present in an amount of about 10 to about 30% by weight and has about 1:3 to 3:1 parts of epoxy to elastomer.

7. The article of claim 6, wherein said filler is a mineral filler.

8. The article of claim 3, wherein said sealant is substantially free of ethylene vinyl acetate.

9. The article of claim 3, wherein said sealant is self leveling at elevated temperatures for providing a smooth paintable surface.

10. The article of claim 1, wherein said curing agent is an amidoamine.

11. The article of claim 1, wherein said curing agent is an a polyamide.

12. The article of claim 1, wherein said curing agent is a cycloaliphatic amines.

13. The article of claim 1, wherein said curing agent is selected from an aliphatic or aromatic amine or their respective adducts.

14. The article of claim 3, wherein the partial cure is effected using an acid cure for inducing homopolymerization on or within the material.

15. The article of claim 3, wherein the partial cure is effected using a liquid for effectuating the initiation of a condensation reaction.

16. The article of claim 6, wherein the epoxy/elastomer hybrid includes a blend of an epoxy and a thermoplastic elastomer.

17. The article of claim 6, wherein the epoxy/elastomer hybrid includes a blend of an epoxy and a thermosetting elastomer.

18. The article of claim 6, wherein the epoxy/elastomer hybrid includes a blend of an epoxy and a mixture of a thermosetting elastomer and a thermoplastic elastomer.

19. The article of claim 6, wherein the epoxy/elastomer hybrid includes a copolymer of an epoxy and a thermoplastic elastomer, a thermosetting elastomer or a mixture thereof.

20. The article of claim 6, further comprising an accelerator.

* * * * *